(12) United States Patent
Chevallier-Mames et al.

(10) Patent No.: US 9,336,370 B2
(45) Date of Patent: May 10, 2016

(54) METHOD AND APPARATUS FOR DYNAMIC OBFUSCATION OF STATIC DATA

(71) Applicant: Apple Inc., Cupertino, CA (US)

(72) Inventors: Benoit Chevallier-Mames, Paris (FR); Daniel F. Reynaud, San Jose, CA (US); Jonathan G. McLachlan, San Francisco, CA (US); Julien Lerouge, San Jose, CA (US); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 13/707,444

(22) Filed: Dec. 6, 2012

(65) Prior Publication Data

US 2014/0165208 A1 Jun. 12, 2014

(51) Int. Cl.
*G06F 21/00* (2013.01)
*G06F 21/14* (2013.01)
*G06F 9/44* (2006.01)

(52) U.S. Cl.
CPC .. *G06F 21/14* (2013.01); *G06F 8/30* (2013.01)

(58) Field of Classification Search
None
See application file for complete search history.

(56) References Cited

U.S. PATENT DOCUMENTS

| | | | | |
|---|---|---|---|---|
| 5,388,192 | A * | 2/1995 | Ohsawa | G09G 5/393 345/634 |
| 7,124,445 | B2 * | 10/2006 | Cronce et al. | 726/26 |
| 7,430,670 | B1 | 9/2008 | Horning et al. | |
| 7,664,937 | B2 * | 2/2010 | Jacob | G06F 21/14 712/205 |
| 8,136,158 | B1 * | 3/2012 | Sehr et al. | 726/22 |
| 8,151,349 | B1 | 4/2012 | Yee et al. | |
| 8,161,463 | B2 | 4/2012 | Johnson et al. | |
| 2003/0236986 | A1 * | 12/2003 | Cronce | G06F 21/14 713/189 |
| 2006/0031686 | A1 * | 2/2006 | Atallah et al. | 713/190 |
| 2006/0130016 | A1 * | 6/2006 | Wagner | G06F 9/4812 717/136 |
| 2007/0039048 | A1 * | 2/2007 | Shelest | G06F 21/566 726/22 |
| 2007/0256064 | A1 * | 11/2007 | Torrubia | G06F 21/125 717/151 |
| 2007/0256138 | A1 * | 11/2007 | Gadea | G06F 21/125 726/26 |
| 2008/0127125 | A1 * | 5/2008 | Anckaert | G06F 21/53 717/136 |
| 2008/0215860 | A1 * | 9/2008 | Jacob | G06F 21/14 712/226 |
| 2010/0281459 | A1 * | 11/2010 | Betouin et al. | 717/106 |
| 2011/0138473 | A1 * | 6/2011 | Yee et al. | 726/26 |
| 2011/0138474 | A1 * | 6/2011 | Yee | G06F 9/445 726/26 |
| 2011/0167414 | A1 * | 7/2011 | Lattner et al. | 717/140 |

OTHER PUBLICATIONS

Bletsch, Tyler et al., "Mitigating Code-Reuse Attacks with Control-Flow Locking," ACSAC '11, Dec. 5-9, 2011, Orlando, FL, USA, 10 pages.
"Dynamic Data Masking Introduction," White Paper, ActiveBase Ltd., Mar. 2010, 7 pages.

\* cited by examiner

*Primary Examiner* — Abu Sholeman
*Assistant Examiner* — Maung Lwin
(74) *Attorney, Agent, or Firm* — Blakely, Sokoloff, Taylor & Zafman LLP

(57) ABSTRACT

A method and an apparatus that provide rewriting code to dynamically mask program data statically embedded in a first code are described. The program data can be used in multiple instructions in the first code. A code location (e.g. an optimal code location) in the first code can be determined for injecting the rewriting code. The code location may be included in two or more execution paths of first code. Each execution path can have at least one of the instructions using the program data. A second code may be generated based on the first code inserted with the rewriting code at the optimal code location. The second code can include instructions using the program data dynamically masked by the rewriting code. When executed by a processor, the first code and the second code can generate identical results.

22 Claims, 6 Drawing Sheets

200

Providing rewriting code for program data embedded in first code, wherein the program data is used in one or more instructions of the first code, the rewriting code to dynamically mask the program data 201

Determining a code location in the first code for the rewriting code, wherein the code location is located in two or more execution paths of first code, each execution path including at least one of the instructions using the program data 203

Generating second code based on the first code inserted with the rewriting code at the code location, the second code including instructions using the program data dynamically masked by the rewriting code, wherein the second code when executed by a processor produces an identical result as the first code 205

Compiling source code to statically mask program data of the source code for a first code, the source code including annotation identifying the program data to be dynamically masked, the first code including one or more instructions using the program data statically masked 301

Determining an code location in the first code to dynamically mask the program data, wherein the code location is located in two ore more execution paths of first code, each execution path including at least one of the instructions using the program data statically masked 303

Generating a second code based on the first code inserted with rewriting code at the code location, the rewriting code to dynamically mask the program data, the second code including instructions using the program data dynamically masked by the rewriting code, wherein the second code when executed by a processor produces an identical result as the first code 305

Fig. 3

400
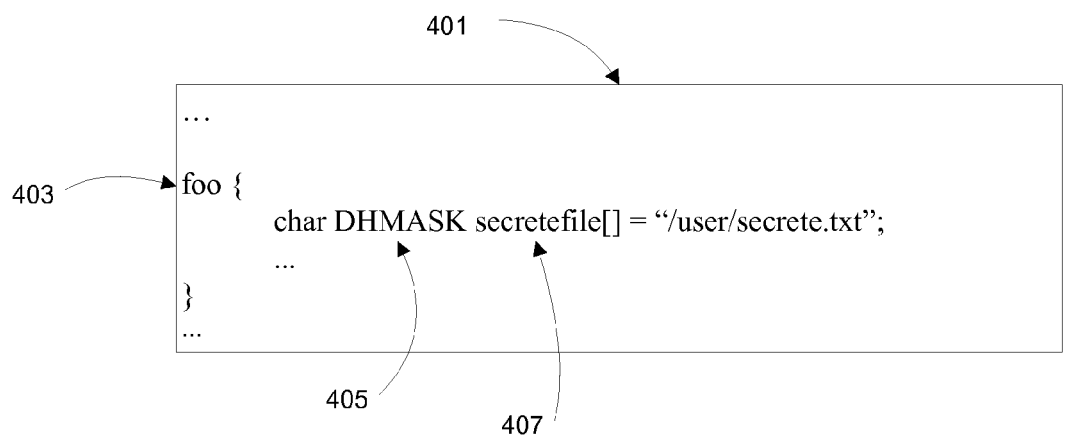
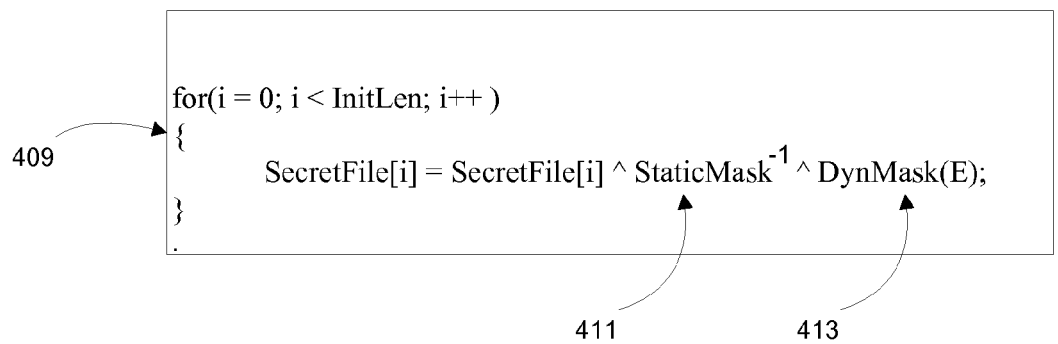
Fig. 4

METHOD AND APPARATUS FOR DYNAMIC OBFUSCATION OF STATIC DATA

FIELD OF INVENTION

Embodiments of the present invention relate generally to cryptographic processing. More particularly, this invention relates to dynamic obfuscation of computer program data.

BACKGROUND

Software publishers often attempt to restrict access to portions of compiled software executables to thwart would-be reverse engineering while still allowing the executables to function properly. Reverse engineering is the practice of dissecting and/or analyzing software to understand how it works. On certain systems, reverse engineering can retrieve information stored within software such as information related to cryptographic keys or copy protection schemes. Reverse engineers can even tamper with the software itself.

A reverse engineer attacks a program from two main paths, data and control flow. One simple straight forward way to protect data is to mask it. That is, change its representation with an efficient operation. So, instead of storing A in memory, store A^X, where X is some static mask selected at runtime.

An even better way to mask A would be to use a dynamic mask, or an X that is selected 'randomly' at runtime. This way, A^X changes at runtime even though A itself may not be changing. This is better security, as the A^X changes when either A changes or X changes, as opposed to only when A changes (when X is static).

However, one of the drawbacks to this mechanism is that this dynamic transform to A cannot be applied at compile time if A is supposed to be 'baked' into the binary itself (for example, as an initializer), so that the initial starting value does not actually receive a dynamic mask. It is impossible to do so, without going in and rewriting the binary code, and then loading the freshly written one, since it is a static value baked into the binary.

Therefore, traditional mechanisms for protecting program data are slow, bulky, and not effective.

SUMMARY OF THE DESCRIPTION

In one embodiment, optimal code locations in a program (or code) may be determined at compile time to update the program to allow dynamic masking of statically masked program data of the program at runtime. Statically masked program data may be copied into a new variable at the determined code locations for dynamic masking. Instead of using the statically masked program data, the dynamically masked data is used (or accessed, read) when executing the program for program or code obfuscation. The program data may be dynamically hidden to prevent reverse engineering to uncover secret data used in operations using the program data.

In another embodiment, rewriting code may be provided to dynamically mask program data statically embedded in first code. The program data can be used in multiple instructions in the first code. A code location (e.g. an optimal code location based on certain required processing resource measures) in the first code can be determined for injecting the rewriting code. The code location may be included in two or more execution paths of the first code. Each execution path can have at least one of the instructions using the program data. A second code may be generated based on the first code inserted with the rewriting code at the code location. The second code can include instructions using the program data dynamically masked by the rewriting code. When executed by a processor, the first code and the second code can generate identical results.

In another embodiment, source code can be compiled into a first code with statically masked program data of the source code. The source code can include annotation identifying the program data to be dynamically masked. The first code may include one or more instructions using the program data statically masked. Code locations in the first code can be determined to insert rewriting code to dynamically mask the program data. A code location may be located in two or more execution paths of the first code. Each execution path can include at least one of the instructions using the program data statically masked. A second code may be generated based on the first code inserted with rewriting code at the optimal code location. The second code can include instructions using the program data dynamically masked by the rewriting code. The second code, when executed by a processor, can produce an identical result as the first code.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is a flow diagram illustrating a method for dynamically obfuscating static code data according to one embodiment of the invention.

FIG. 3 is a flow diagram illustrating a method to locate code locations for dynamically obfuscating static code data according to one embodiment of the invention.

FIG. 4 is a code diagram illustrating sample pseudocodes for dynamically masking statically masked data according to one embodiment of the invention.

DETAILED DESCRIPTION

Figure 1:
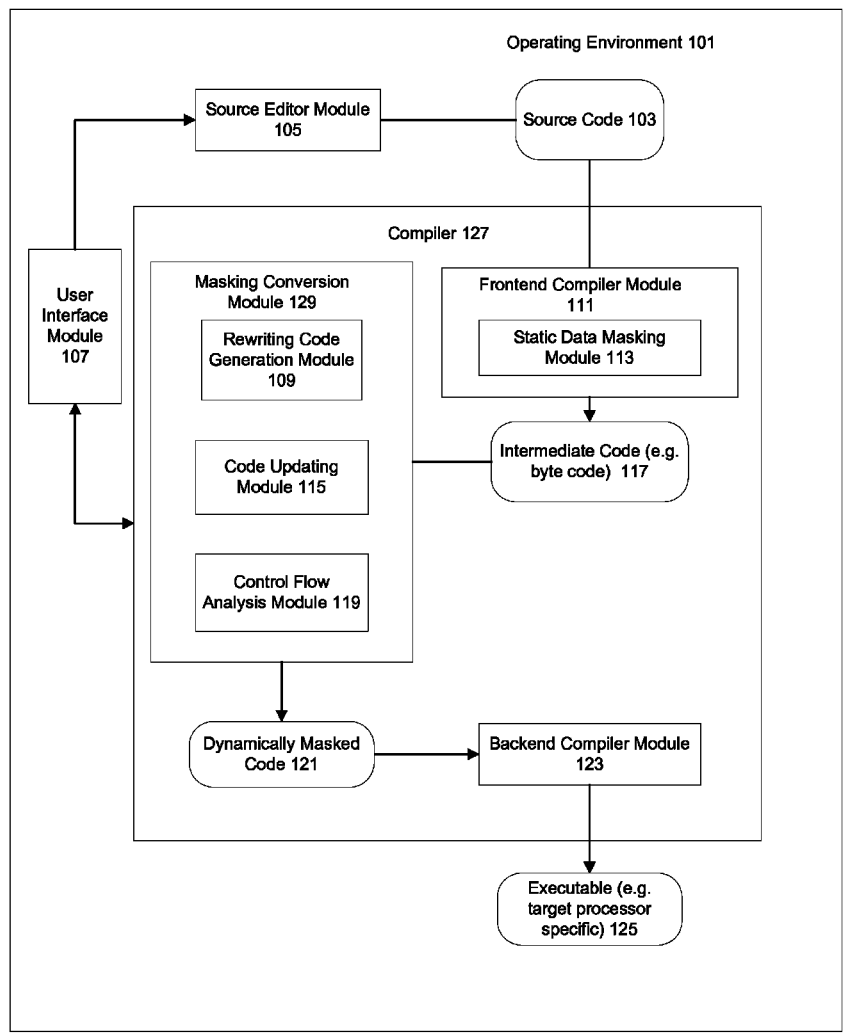
FIG. 1 is a block diagram illustrating a dynamic obfuscation system according to one embodiment of the invention.

Methods and apparatuses for dynamic obfuscation of static data are described herein. In the following description, various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in connection with the embodiment can be included in at least one embodiment of the invention.

The appearances of the phrase "in one embodiment" in various places in the specification do not necessarily all refer to the same embodiment.

Code locations in a program having program data may be determined (or selected) during compile time to insert instructions to copy the program data, e.g. statically masked data, to new variables which are dynamically masked. In some embodiments, code locations may be optimally selected based on expected execution resources (e.g. number of instructions to be executed, memory usage etc.) required to execute the program with dynamically masked program data during runtime. The mechanism of copying may allow the application of a dynamic mask to the program data which may be originally statically masked as part of the program for code obfuscation. The code locations may be identified based on required execution resources of the program based on, for example, control flow analysis of the program.

In one embodiment, a program may be inspected to identify usage of program data, A, of the program to select optimal locations to perform copy operations to copy A from a statically protected value to a dynamically protected variable A'. As a result, the level of code obfuscation may be increased to further secure the program data. For example, a program data array of the program may appear differently for each run or execution of the program. Code maintenance cost may be decreased by ensuring that optimal locations are selected even when the underlying code of the program changes, for example, to allow a programmer to focus on more interesting security problems related to code protection instead of code maintenance.

In some embodiments, each function (e.g. a block of code) using statically masked program data of a program may be updated to use corresponding dynamically masked program data. Copy operations to convert the statically masked program data may be performed in execution paths of the program prior to invoking the function using the program data. Code location within the function (e.g. at the beginning of the function code block) may be heuristically determined to inject conversion code to convert static masking to dynamic masking of the program data. Heuristics may be provided by a user or programmer (e.g. via annotation based on a user interface) to indicate preferences of the code location for the conversion code. Optionally, code location selected by a user may overwrite heuristically identified code locations.

In one embodiment, program data may have a static representation when stored in a non-volatile storage device, such as a disk or flash memory etc. During runtime, the program data may have been already converted into a dynamic representation whenever the program data is used in code. A dynamic representation of the program data (e.g. in a runtime memory) may be different from the static representation of the program data (e.g. stored in a disk). The dynamic representation of the program data for the current run of the program may be different from another dynamic representation of the same program data in the last run, even though nothing has changed in running the program, to increase difficulty or cost for an attacker to figure out actual value of the program data, such as a security key array of fixed initial values, global data strings or other applicable program data.

According to one embedment, a compiler tool may be provided to prevent reverse engineering of a program via dynamic data masks to change data representation of program data in the program. Random values may be dynamically generated based on arithmetic (e.g. addition. xor, multiplication, etc.) or other applicable data operations to account for the change of data representation. The dynamic data representation can add another layer of security protection on a program against back tracing to relate data appearing in runtime memory when executing the program to how pieces of sensitive program data (e.g. key file) are actually used and represented in the program.

During runtime, statically obfuscated data may be initialized to represent statically masked program data. For example, a compiler may statically obfuscate (or scramble, randomly rename, etc.) a constant data string defined during compile time or a secrete file name referencing key files referenced in the program. The compiler may update the program to allow the program, when executed, to put dynamic masks on the statically masked program data at best code locations and use the dynamically masked program data without using the statically masked program data.

In some embodiments, dynamic masks put on program data via the compiler tool may require randomness based on runtime entropy from outside world (e.g. outside of the program), such as the runtime system or other runtime environments or states. A compiler tool may enable the dynamic masks to receive the runtime entropy dynamically.

In one embodiment, use case in a program or code may be analyzed to identify best possible code locations or places to convert static masked program data to dynamically masked program data. A use case may represent executions paths, call graphs or control flows, for example, based on if/else branches, conditional/unconditional jumps, true/false comparison branches, function calls, or other applicable control instructions in the program. Best function block(s) may be selected for injecting conversion code to put dynamic masks on the program data, for example, according to least amount of computation resources required to execute the program.

In one embodiment, a compiler may determine to insert conversion code for dynamically masking program data before its use without incurring the cost of executing the conversion code for execution paths that do not need to access program data. For example, the conversion code may be avoided in hot spots (e.g. with high execution cost) in the program, such as code blocks with iterating or looping controls. Dominating code block may be analyzed for usage of the program data to determine best code locations for the conversion code.

According to certain embodiments, optimal code locations for inserting statically masked program data to dynamically masked program data may be selected based on dominating common blocks. For example, code blocks using the statically masked program data in a program may be identified via a control flow graph of the program. Each code block may correspond to a node in the control flow graph. A common block of the identified code blocks may correspond to a node belonging to each execution path having at least one of the identified nodes in the control flow graph. In other words, the common block may represent a common ancestor node (or parent node) for the identified nodes. The dominating common block may represent a common block closest (e.g. based execution path distance in the control flow graph) to the identified code blocks using the program data. A compiler may insert conversion code in the dominating common block, for example, to remove static masks from the program data and apply dynamic masks to the program data.

FIG. 1 is a block diagram illustrating a dynamic obfuscation system according to one embodiment of the invention. In one embodiment, system 100 may include operating environment 101 hosted in a data processing device, such as a desktop computer, a server, a compiler machine, a mobile device or other applicable devices etc. Operating environment 101 may include compiler 127 to compile source code 103 and generate executable 125 with dynamic masking capabilities on static data inside source code 103. Compiler 127 may convert statically masked code data to be dynamically masked code during runtime. User interface module 107 may allow a user to annotate portions of source code 103 for dynamic and/or static obfuscation or masking via source editor module 105.

In one embodiment, compiler 127 may include frontend compiler module 111 which is capable of generating intermediate code 117 from source code 103 during a front end process during compilation of source code 103. Intermediate code 117 may include intermediate or mid level representation (e.g. .bc code) of source code 103. Intermediate code 117 may preserve annotations for data masking in original source code 103 as markers or other indicators.

In one embodiment, intermediate code 117 may be agnostic to different programming languages and target execution architectures. For example, source code 103 may be based on certain programming language, such as static, dynamic, functional, descriptive, interpretive or other kinds of applicable languages. Executable 125 may be provided according to one of multiple processors or targeted hardware architectures for code execution. Dynamic code obfuscation capability of compiler 127 may be language agnostic and processor agnostic based on intermediate code 117.

Source code 103 may include code data or program data which are static in nature to be used or referenced during runtime. Code data may comprise, for example, initializer data, constant string value, static array values etc. In certain embodiments, executable 125 may include code data specified in source code 103. For example, executable 125 may include an identifier or directive indicating a portion of executable 125 comprising code data. Executable 125 may be stored and retrieved from a storage device (e.g. memory, a hard disk or other applicable devices) together with the code data.

In one embodiment, frontend compiler module 111 may include static data masking module 113 to obfuscate code data included in source code 103. Static data masking module 113 can automatically identify code data or program data specified inside source code 103. Alternatively, static data masking module 113 may select which portion of code data of source code 103 to mask based on user annotations. Static data masking module 113 may apply obfuscating operations, such as exclusive-or operations, arithmetic operations, or other applicable operations to mask code data based on, for example, static masks provided via compiler 127 (e.g. during compiler time). In some embodiments, intermediate code 117 can include instructions to unmask the code data when the code data is used (or read, accessed) in intermediate code 117.

Masking conversion module 129 can identify and convert statically obfuscated code data to dynamically obfuscated code data based on intermediate code 117. For example, user requests to dynamically mask code data may be indicated as special annotation in source code 103. Identifying which code data in intermediate code 117 for dynamic masking may be facilitated via the special annotations preserved in intermediate code 117. Alternatively, statically masked code data may be automatically identified from intermediate code 117 for conversion to dynamically masked code data during compilation.

Rewriting code generation module 109 may provide dynamic obfuscating instructions for statically masked code data identified from intermediate code 117. For example, dynamic obfuscating instructions can allow fresh dynamic masks to be generated during runtime on a per function call basis (e.g. during the same execution), per run (e.g. each execution) basis or other applicable levels of randomness. For example, calling a function using dynamic masks twice in a per run basis would result in different dynamic masks obfuscating the same code data. Dynamic obfuscating instructions can include sources of entropy to provide the randomness, variability or unpredictability to the dynamic masks. The source of entropy may be based on runtime system status, random pointer value, or other applicable random value generation mechanisms. User interface module 107 may allow a user to specify or configure levels of randomness associated with dynamic masking via masking conversion module 129.

In one embodiment, during one pass of conversion or compilation of compiler 127, code updating module 115 may inject or insert generated dynamic obfuscating instructions into intermediate code 117, for example, to convert statically masked data to dynamically masked data. Control flow analysis module 119 may determine wherein in intermediate code 117 to insert generated dynamic obfuscating instructions.

For example, control flow analysis module 119 can perform analysis (e.g. static analysis or dynamic analysis) of intermediate code 117 based on a control flow graph representing execution paths (or sequence of instructions) specified in intermediate code 117. A control flow graph analysis may be based on a function specified in intermediate code 117. In one embodiment, each function may correspond to a separate control flow graph.

A control flow graph may be associated with graph notation for all paths that might be traversed through a program, such as intermediate code 117, during its execution. Each node in the control flow graph may represent a basic block, such as a straight-line piece of code without jumps or jump targets. Jump targets specified in the code may start a block of the graph. Jumps specified in the code may indicate an end of a block. Directed edges of the graph may represent jumps in the control flow.

A control flow graph may include an entry block and an end block. All control or execution paths may enter into the flow graph via the entry block and leaves via the end block. A block M can dominate a block N in the flow graph if every path from the entry that reaches block N has to pass through block M. The entry block can dominate all blocks in the flow graph. A common dominating block for multiple blocks in the flow graph can dominate each of the multiple blocks. An execution path from a least common dominating block to the multiple blocks can have the shortest distance (e.g. measured in number of nodes or blocks in the flow graph) among distances of execution paths from other common dominating blocks to the multiple blocks in the flow graph.

In one embodiment, control flow analysis module 119 can locate where or which code block of a flow graph of intermediate code 117 to inject generated dynamic obfuscating instructions (or code) for statically masked code data based on the control flow graph. For example, control flow analysis module 119 may identify where (e.g. which blocks in the flow graph) the statically masked code data are used (or accessed) in intermediate code 117. A least common dominating (LCD) block of the identified blocks (i.e. where the statically masked code data are used) in the flow graph may be determined.

Dynamic obfuscating instructions for code data may be injected into the determined LCD block among identified blocks using the code data to optimize resource usage (e.g. number of instructions to execute or other processing cost) to convert statically masked code data to dynamically masked code data during runtime. In some embodiments, dynamic obfuscating instructions can be inserted at the end of a block of code (e.g. identified LCD block). Alternatively, the dynamic obfuscating instruction can be put at beginning of the block.

During a separate pass of conversion or compilation via compiler 127, in some embodiments, code updating module 115 can update usage of the code data (e.g. instructions accessing the code data) based on the dynamically masked code data. As a result, masking conversion module 129 can convert intermediate code 117 which uses statically masked code data to dynamically masked code 121 which uses dynamically masked code data. Executable 125 may be generated from dynamically masked code 121 via backend compiler module 123.

FIG. 2 is a flow diagram illustrating a method for dynamically obfuscating static code data according to one embodiment of the invention. Exemplary process 200 may be performed by a processing logic that may include hardware, software or a combination of both. For example, process 200 may be performed by system 100 of FIG. 1. At block 201, the processing logic of process 200 may provide rewriting code for program data statically embedded in the first code, for example, at compile time of the first code. The program data may be statically masked in the first code. The rewriting code may be inserted into the first code to convert the statically masked program data to dynamically masked data.

The program data may be used (e.g. accessed, read, etc.) in one or more instructions of the first code. The rewriting code may be performed to dynamically mask the program data at runtime of the first code. In one embodiment, the first code can include intermediate byte code corresponding to a source code coded with the original program data. The program data can represent the original program data statically obfuscated via static masks to increase security level of the code.

In one embodiment, the rewriting code may include instructions to recover the original program data by removing the static masks. For example, data processing operations opposite (or inverse) to the static masks put on the original program data may be performed to uncover or recover the original program data. The dynamically masked program data may be based on the original program data recovered from the program data embedded in the first code.

The rewriting code can include instructions to generate a dynamic mask during runtime to randomly mask the program data. For example, the rewriting code may include instructions to access runtime status associated with a processor executing the code, e.g. the first code updated with the rewriting code. The randomness or level of randomness of a dynamically generated mask for the program data may be based on the runtime status of the processor, status (or states) of runtime environments or other applicable runtime status during execution. The dynamic mask may be generated once for each execution or each run of the code.

At block 203, the processing logic of process 200 may determine an optimal code location in the first code to insert the rewriting code. The optimal code location may be located in two or more execution paths of the first code. Each execution path can include at least one instruction (or code) using the program data. In one embodiment, certain execution paths of the first code may not include instructions using the program data. The first code can include separate code blocks. Each code block, for example, may specify a function, a subroutine or other code structures which can be addressed via instructions in the program to direct execution path to the code block.

In one embodiment, the processing logic of process 200 may generate a control flow for the first code to determine optimal code locations for inserting the rewriting code or conversion code. The control flow can represent a directed graph of calling relationships among the separate code blocks. Each execution path of the first code may correspond to a directed path of the graph in the control flow. The processing logic of process 200 can identify which of the separate code blocks of the first code include instructions using the program data. The optimal code locations may be located in a particular execution path which includes at least one of the identified code blocks using the program data.

The processing logic of process 200 can determine a dominating one of the code blocks in the first code for the identified code blocks using the program data. For example, the dominating code block may correspond to a nearest common ancestor block among the identified code blocks according to the directed graph. The optimal code location may be located within the dominating code block. In one embodiment, the dominating code block can include a sequence of instructions and the optimal code location may be located next to last one of the sequence of instructions in the dominating code block. Other code locations within the dominating code block may be applicable for inserting the rewriting code for the program data.

At block 205, the processing logic of process 200 can generate second code based on the first code inserted with the rewriting code at optimal code location(s). The second code can include instructions using the program data dynamically masked by the rewriting code. When executed via a processor during runtime, the second code can produce an identical result as the first code. In other words, the processor can execute instructions compiled based on the first code to produce the same result.

In one embodiment, the processing logic of process 200 can obfuscate the program data dynamically via multiple dynamic masks during an execution of the second code. The rewriting code may be executed more than once to generate the multiple dynamic masks. In some embodiments, each run of the second code may provide a separate dynamic mask for masking the program data. The processing logic of process 200 can update instructions using the program data in the first code with the instructions using the program data dynamically masked by the rewriting code in the second code.

In one embodiment, the processing logic of process 200 can compile source code for the first code (e.g. byte code or other applicable intermediate code) using static masks for the program data embedded in the source code. Executable code generated (e.g. target executable code for a target processor) for the second code may include directives identifying a data portion and a text portion of the executable code. The data portion may include the program data representing the original program data statically obfuscated via the static masks. In some embodiments, the directives may identify a text portion of the executable code. The text portion can include target instructions using the program data dynamically masked via the rewriting code.

In certain embodiments, the processing logic of process 200 may select the statically masked program data from the first code for dynamically masking the program data in the second code, for example, during compilation. The source code may include annotation (e.g. by a user via a user interface) identifying the original program data to be dynamically masked for the selection. Code locations in the first code for inserting the rewriting code may be determined without a need for user annotations in the corresponding source code indicating where the optimal code locations should be.

FIG. 3 is a flow diagram illustrating a method to locate code locations for dynamically obfuscating static code data according to one embodiment of the invention. Exemplary process 300 may be performed by a processing logic that may include hardware, software or a combination of both. For example, process 300 may be performed by system 100 of FIG. 1. At block 301, the processing logic of process 300 can compile source code to statically mask program data of the source code to generate a first code, such as an intermediate byte code. The first code may be independent of processors targeted for execution and/or programming languages used for the first code. The source code may include annotations identifying program data embedded in the source code to be dynamically masked. The first code may be generated to include one or more instructions using the program data statically masked.

At block 303, the processing logic of process 300 may determine an optimal code location in the first code to dynamically mask the program data. The optimal code location may be located in multiple execution paths of first code. Each execution path can include at least one of the instructions using the program data statically masked.

At block 305, the processing logic of process 300 can generate a second code based on the first code inserted with rewriting code at the optimal code location. The rewriting code may be executed to dynamically mask the program data. The second code can include instructions updated to the first code using the program data dynamically masked by the rewriting code. In some embodiments, execution based on the second code by a processor can produce an identical result as execution based on the first code.

FIG. 4 is a code diagram illustrating sample pseudocode for dynamically masking statically masked data according to one embodiment of the invention. Sample code 400 may be processed based on some components of system 100 of FIG. 1. Code 401 may illustrate a source code including a function block 403 embedded with program data 405 as a string array. In one embodiment, code 401 may be annotated with annotation 407 (e.g. a text representation) to indicate that program data 405 should be dynamically masked. Code 409 may be generated based on, for example, intermediate code compiled from code 401 with static masks masking program data 405. In one embodiment, code 409 may include inverse operations 411 on static masks (e.g. exclusive or) to recover original program data 407. Dynamic masks 413 as a function of entropy E may be applied during runtime to mask program data 407. Entropy E of dynamic masks 413 may be based on runtime state when code 405 is executed.

Figure 5:
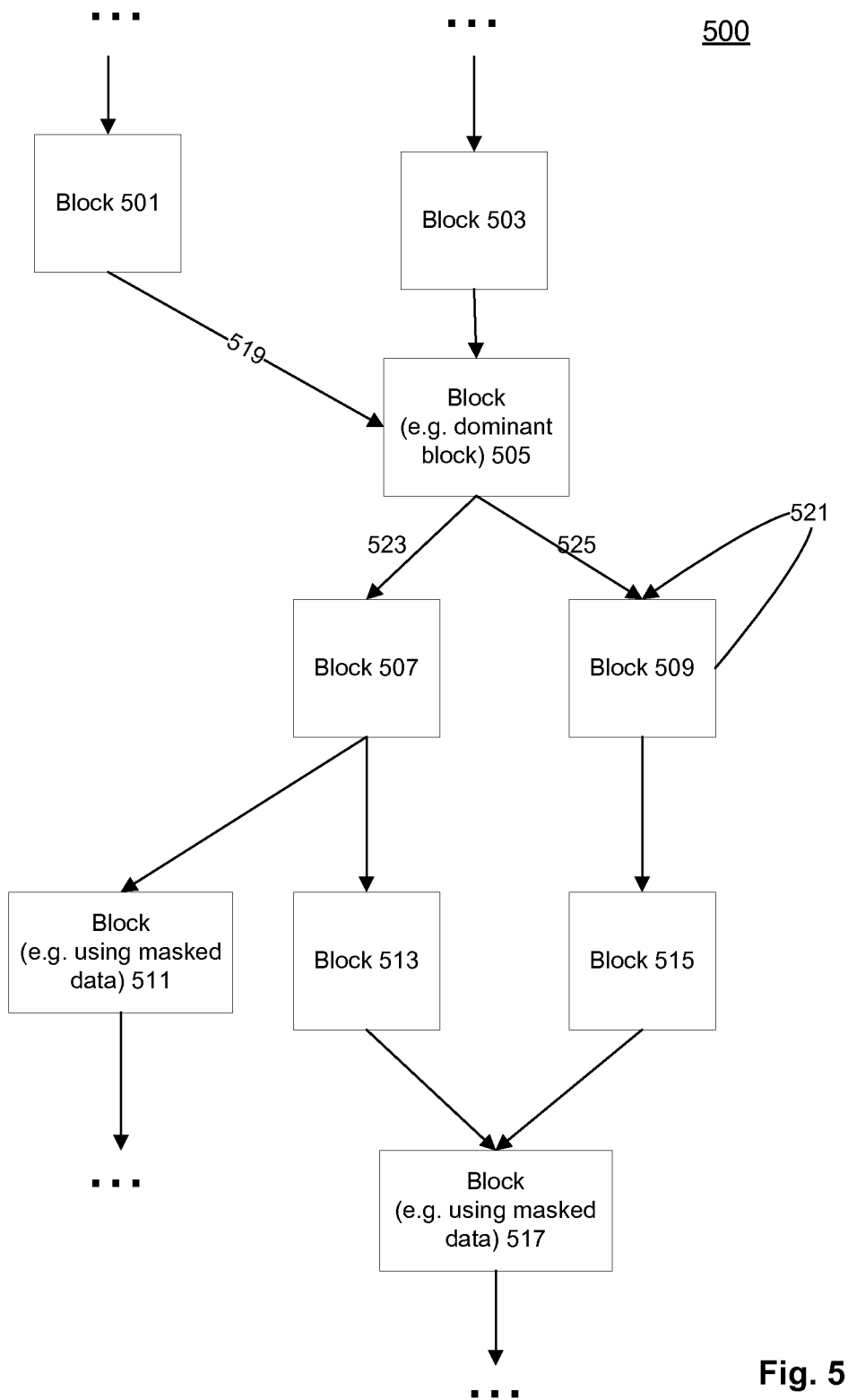
FIG. 5 is a block diagram illustrating a sample control flow for identifying code locations to dynamically obfuscate static code data according to one embodiment of the invention.

FIG. 5 is a block diagram illustrating a sample control flow for identifying code locations to dynamically obfuscate static code data according to one embodiment of the invention. For example, diagram 500 may represent a control flow analyzed for a code block, such as a function code, based on some components in system 100 of FIG. 1. Diagram 500 may belong to an overall control flow of a source code based on an control flow analysis In one embodiment, diagram 500 may include code blocks corresponding to code structures. For example block 509 may represent a group of instructions having a loop structure. Block 505 may include branch instructions to direct execution to either block 507 or block 509. Diagram 500 may specify parent child relationships according to execution flows, such as edges 519, 523, 525, 521 among the blocks (or nodes). For example, block 501 and block 505 may be related as parent block and child block with each other. Block 517 may be related to multiple parent blocks 513, 515. Ancestry/descent relationship may be derived based on the parent/child relationships.

An execution path in diagram 500 may include a sequence of blocks (nodes) following the parent/child relationships. For example, diagram 500 can include an execution path through blocks 501, 505, 507 and 511. In one embodiment, diagram 500 may include blocks 511, 517 using program data to be dynamically masked. A dominating (or dominant) common block or lowest common block 505 may be identified from common ancestry blocks based on shortest or nearest distance (e.g. based on number of graph nodes or other applicable measures) to blocks 511, 517 among execution paths including either block 511 and/or block 517. In one embodiment, blocks 511, 517 may use statically masked program data embedded in a source code. Dominating common block 505 of block 511, 517 may be selected as optimal code location to insert rewriting code to convert statically masked program data to dynamically masked program data. Both blocks 511, 517 may be updated to use the dynamically masked program data when executed.

Figure 6:
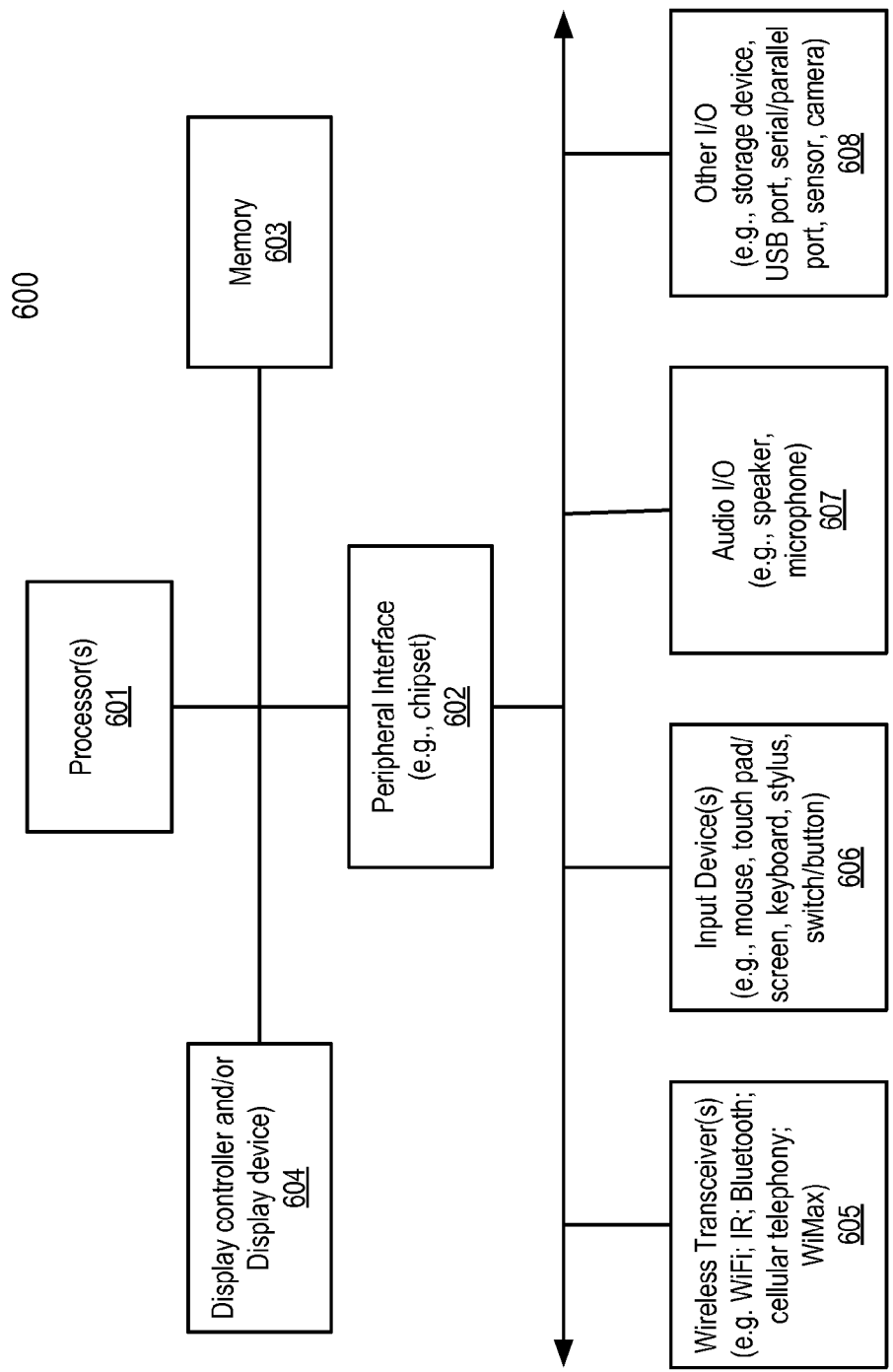
FIG. 6 is a block diagram illustrating an example of a data processing system which may be used with one embodiment of the invention.

FIG. 6 is a block diagram illustrating an example of a data processing system which may be used with one embodiment of the invention. For example, system 600 may represent any of data processing systems described above performing any of the processes or methods described above, such as, for example, system 100 of FIG. 1. System 600 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 6, in one embodiment, system 600 includes processor 601 and peripheral interface 602, also referred to herein as a chipset, to couple various components to processor 601 including memory 603 and devices 605-608 via a bus or an interconnect. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 601 is configured to execute instructions for performing the operations and steps discussed herein.

Peripheral interface 602 may include memory control hub (MCH) and input output control hub (ICH). Peripheral interface 602 may include a memory controller (not shown) that communicates with a memory 603. Peripheral interface 602 may also include a graphics interface that communicates with graphics subsystem 604, which may include a display controller and/or a display device. Peripheral interface 602 may communicate with graphics device 604 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 601. In such a configuration, peripheral interface 602 operates as an interface chip performing some functions of the MCH and ICH. Furthermore, a graphics accelerator may be integrated within the MCH or processor 601.

Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 602 may provide an interface to IO devices such as devices 605-608, including wireless transceiver(s) 605, input device(s) 606, audio IO device(s) 607, and other IO devices 608. Wireless transceiver 605 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 607 may include a speaker and/or a microphone to facilitate voice-enabled functions, such as voice recognition, voice replication, digital recording, and/or telephony functions. Other optional devices 608 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 608 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable storage medium having instructions stored therein, which when executed by a computer, cause the computer to perform a method comprising:
   providing a first code including program data statically embedded in the first code, wherein a first executable code can be generated from the first code, wherein the program data is statically masked but not dynamically masked in the first executable code;
   providing rewriting code to dynamically mask the program data;
   determining a code location in the first code for the rewriting code, wherein the code location is located in two or more execution paths of first code, each of the two or more execution paths including at least one of the instructions using the program data;

generating second code based on the first code inserted with the rewriting code at the code location; and generating a second executable code from the second code, wherein the second executable code is storable in a non-volatile storage device, wherein the second executable code when stored in the non-volatile storage device includes a static representation of the program data and instructions to use the program data based on a dynamic representation of the program data, wherein the static representation of the program data is generated during compile time of the second executable code, wherein the dynamic representation of the program data is generated during runtime of the second executable code based on the static representation of the program data, the program data dynamically masked via the dynamic representation by the rewriting code, wherein the second executable code when executed by a processor produces an identical result as the first executable code.

2. The medium of claim 1, wherein the first code comprises intermediate byte code corresponding to a source code including original program data, and wherein the program data represents the original program data statically obfuscated via static masks.

3. The medium of claim 2, further comprising:
compiling the source code for the first code using the static masks, the second executable code including directives identifying a data portion and a text portion of the second executable code, the data portion including the program data representing the original program data statically obfuscated via the static masks.

4. The medium of claim 3, wherein the text portion includes the instructions using the program data based on the dynamic representation of the program data.

5. The medium of claim 2, wherein the rewriting code includes instructions to recover the original program data via the static masks and wherein the dynamically masked program data is based on the original program data recovered from the program data embedded in the first code.

6. The medium of claim 2, further comprising:
selecting the statically masked program data from the first code for dynamically masking the program data in the second code.

7. The medium of claim 6, wherein the source code includes annotation identifying the original program data, and wherein the selection is based on the annotation of the source code.

8. The medium of claim 7, wherein the code location of the first code corresponds to a code location of the source code and wherein the source code does not include annotation identifying the code location of the source code.

9. The medium of claim 1, wherein the rewriting code includes instructions to generate a dynamic mask during runtime.

10. The medium of claim 9, wherein the rewriting code includes instructions to access runtime status associated with the processor and wherein the dynamically masked program data is based on the runtime status.

11. The medium of claim 9, wherein the dynamic mask is generated once for each execution of the second code.

12. The medium of claim 9, wherein the program data is obfuscated dynamically via multiple dynamic masks during an execution of the second code, and wherein the rewriting code is executed more than once to generate the multiple dynamic masks during the execution.

13. The medium of claim 1, wherein the code location is located in two or more execution paths of the first code, each of the two or more execution paths including at least one of the instructions using the program data.

14. The medium of claim 13, wherein a control flow of the first code is represented by a directed graph of calling relationships among separate code blocks of the first code, wherein one or more of the separate code blocks include at least one of the instructions using the program data, wherein a dominating code block is determined as the nearest common ancestor block among the one or more of the separate code blocks according to the directed graph, and wherein the code location is located in the dominating code block.

15. The medium of claim 14, wherein the determining the code locations comprises:
identifying which of the separate code blocks of the first code include at least one of the instructions using the program data based on the static representation, wherein each execution path of the first code corresponds to a directed path of the graph of the control flow, wherein the code location is located in a particular execution path corresponding to a particular path of the graph, wherein the particular path includes at least one of the identified code blocks.

16. The medium of claim 1, wherein at least one execution path of the first code does not include the code location.

17. The medium of claim 1, wherein the first code includes code using the program data and wherein generation of the second code comprises:
updating the code using the program data in the first code with separate code using the program data dynamically masked by the rewriting code in the second code.

18. A non-transitory machine-readable storage medium having instructions stored therein, which when executed by a computer, cause the computer to perform a method comprising:
providing rewriting code for program data statically embedded in a first code, wherein the program data is used in one or more instructions of the first code, the rewriting code to dynamically mask the program data;
determining a code location in the first code for the rewriting code, wherein the code location is located in two or more execution paths of first code, each execution path including at least one of the instructions using the program data, wherein the first code includes separate code blocks and wherein the determining the code location comprises:
generating a control flow for the first code, the control flow representing a directed graph of calling relationships among the separate code blocks, wherein each execution path of the first code corresponds to a directed path of the graph of the control flow, and
identifying which of the separate code blocks of the first code include at least one of the instructions using the program data, wherein the code location is located in a particular execution path corresponding to a particular path of the graph, wherein the particular path includes at least one of the identified code blocks, and
determining a dominating one of the code blocks for the identified code blocks according to the directed graph, wherein the dominating code block corresponds to a nearest common ancestor block among the identified code blocks in the directed graph, and wherein the code location is located in the dominating code block of the first code; and
generating second code based on the first code inserted with the rewriting code at the code location, the second code including instructions using the program data dynamically masked by the rewriting code, wherein the second code when executed by a processor produces an identical result as the first code.

19. The medium of claim 18, wherein the dominating code block includes a sequence of instructions of the first code and wherein the code location is located next to a last one of the sequence of instructions in the dominating code block.

20. A non-transitory machine-readable storage medium having instructions stored therein, which when executed by a computer, cause the computer to perform a method comprising:
compiling source code to statically mask program data of the source code for a first code, the source code including annotation identifying the program data to be dynamically masked, the first code including a static representation of the program data and one or more instructions using the program data based on the static representation, wherein a particular executable code can be generated from the source code, wherein the program data is statically masked but not dynamically masked in the particular executable code;
determining a code location in the first code to dynamically mask the program data, wherein the code location is located in two or more execution paths of first code, each of the two or more execution paths including at least one of the instructions using the static representation of the program data; and
generating a second code based on the first code inserted with rewriting code at the code location, the rewriting code to dynamically mask the program data, wherein the second code is storable in a non-volatile storage device, wherein the second code when stored in the non-volatile storage device includes the static representation of the program data and instructions to use the program data based on a dynamic representation of the program data, wherein the static representation of the program data is generated during compile time of the second code, wherein the dynamic representation of the program data is generated during runtime of the second code based on the static representation of the program data, the program data dynamically masked via the dynamic representation by the rewriting code, wherein the second code when executed by a processor produces an identical result as the particular executable code.

21. A computer implemented method comprising:
providing a first code including program data statically embedded in the first code, wherein a first executable code can be generated from the first code, wherein the program data is statically masked but not dynamically masked in the particular executable code;
providing rewriting code to dynamically mask the program data;
determining a code location in the first code for the rewriting code, wherein the code location is located in two or more execution paths of the first code, each of the two or more execution paths including at least one of the instructions using the program data;
generating a second code based on the first code inserted with the rewriting code at the code location;
generating a second executable code from the second code, wherein the second executable code is storable in a non-volatile storage device, wherein the second executable code when stored in the non-volatile storage device includes a static representation of the program data and instructions to use the program data based on a dynamic representation of the program data, wherein the static representation of the program data is generated during compile time of the second executable code, wherein the dynamic representation of the program data is generated during runtime of the second executable code based on the static representation of the program data, the program data dynamically masked via the dynamic representation by the rewriting code, wherein the second executable code when executed by a processor produces an identical result as the first executable code.

22. A computer system comprising:
a memory storing executable instructions; and
a hardware processor coupled to the memory to execute the executable instructions from the memory, the processor being configured to
provide for a first code including program data statically embedded in the first code, wherein a first executable code can be generated from the first code, wherein the program data is statically masked but not dynamically masked in the first executable code,
provide rewriting code to dynamically mask the program data,
determine a code location in the first code for the rewriting code, wherein the code location is located in two or more execution paths of first code, each of the two or more execution paths including at least one of the instructions using the program data,
generate a second code based on the first code inserted with the rewriting code at the code location, and
generate a second executable code from the second code, wherein the second executable code is storable in a non-volatile storage device, wherein the second executable code when stored in the non-volatile storage device includes a static representation of the program data and instructions to use the program data based on a dynamic representation of the program data, wherein the static representation of the program data is generated during compile time of the second executable code,
wherein the dynamic representation of the program data is generated during runtime of the second executable code based on the static representation of the program data, the program data dynamically masked via the dynamic representation by the rewriting code,
wherein the second executable code when executed by a target processor produces an identical result as the first executable code.

* * * * *